(12) United States Patent
Bourne et al.

(10) Patent No.: US 12,311,391 B2
(45) Date of Patent: May 27, 2025

(54) HANDWASHING ASSEMBLY

(71) Applicant: KOHLER CO., Kohler, WI (US)

(72) Inventors: James Bourne, Cheltenham (GB); Robert Caldwell, Charlton Kings (GB); Thomas Philip Perry, Cheltenham (GB); Adam Luke May, Bristol (GB)

(73) Assignee: Kohler Co., Kohler, WI (US)

( * ) Notice: Subject to any disclaimer, the term of this patent is extended or adjusted under 35 U.S.C. 154(b) by 113 days.

(21) Appl. No.: 18/146,981

(22) Filed: Dec. 27, 2022

(65) Prior Publication Data

US 2023/0133646 A1     May 4, 2023

Related U.S. Application Data

(63) Continuation of application No. PCT/US2021/039673, filed on Jun. 29, 2021.

(60) Provisional application No. 63/046,637, filed on Jun. 30, 2020.

(51) Int. Cl.
*A47K 1/02*     (2006.01)
*B05B 1/30*     (2006.01)

(52) U.S. Cl.
CPC .............. *B05B 1/3026* (2013.01); *A47K 1/02* (2013.01)

(58) Field of Classification Search
CPC ................................. A47K 1/02; B05B 1/2026
USPC ............................................................ 4/619
See application file for complete search history.

(56) References Cited

U.S. PATENT DOCUMENTS

| | | | | |
|---|---|---|---|---|
| 1,746,727 A | * | 2/1930 | Dunlap | B67D 3/02 251/339 |
| 4,394,969 A | * | 7/1983 | Jette | B05B 15/654 239/537 |
| 4,854,486 A | * | 8/1989 | Daley | B67D 3/02 222/484 |
| 10,464,795 B2 | * | 11/2019 | Peithman | B65D 47/248 |
| 2011/0271441 A1 | | 11/2011 | Bayley et al. | |
| 2013/0042404 A1 | | 2/2013 | Littlehorn, Sr. | |
| 2015/0150419 A1 | | 6/2015 | Littlehorn, Sr. | |

(Continued)

FOREIGN PATENT DOCUMENTS

| | | |
|---|---|---|
| EP | 2405061 A2 | 1/2012 |
| EP | 3530163 A2 | 8/2019 |

(Continued)

OTHER PUBLICATIONS

European Official Action dated Jun. 18, 2024 issued in corresponding European application.

*Primary Examiner* — Huyen D Le
(74) *Attorney, Agent, or Firm* — Husch Blackwell LLP (57) ABSTRACT

The hand washing assembly includes a hood defining a cavity within the hood, a valve structure located at least partially within the cavity, and a lever handle. The lever handle is operatively coupled to the valve structure and configured to move the valve structure between a first position in which the valve structure prevents a flow of fluid through the valve structure and a second position in which the valve structure permits the flow of fluid through the valve structure. The lever handle includes a contact surface positioned within the cavity and configured to move toward a top wall of the hood as the valve structure moves into the second position and configured to move away from the top wall as the valve structure moves into the first position.

20 Claims, 5 Drawing Sheets

(56) References Cited

U.S. PATENT DOCUMENTS

2015/0225932 A1   8/2015  Figurski et al.
2019/0234527 A1*  8/2019  Bourne ................ B65D 47/283

FOREIGN PATENT DOCUMENTS

JP    H08184378 A    7/1996
WO    2006058374 A1  6/2006

* cited by examiner

HANDWASHING ASSEMBLY

CROSS-REFERENCE TO RELATED PATENT APPLICATION

This application claims the benefit of and priority to PCT No. PCT/US2021/039673, filed Jun. 29, 2021, which itself claimed priority to U.S. Provisional Patent Application No. 63/046,637, filed on Jun. 30, 2020, the entire disclosure of both of which are incorporated by reference herein.

BACKGROUND

The present disclosure relates generally to systems and assemblies for handwashing. More specifically, the present disclosure relates to handwashing assemblies for use in, for example, remote locations without traditional utility hookups.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

At least one embodiment relates to a handwashing assembly. The hand washing assembly includes a hood, a valve structure, and a lever handle. The hood includes a top wall having an aperture extending through the top wall and one or more sidewalls extending downward from a perimeter of the top wall. The one or more sidewalls define a cavity within the hood. The valve structure is positioned at least partially within the cavity and configured to be fluidly coupled to a fluid source. The valve structure is further configured to receive a flow of fluid from the fluid source through the aperture. The lever handle is operatively coupled to the valve structure and configured to move the valve structure between a first position in which the valve structure prevents the flow of fluid through the valve structure and a second position in which the valve structure permits the flow of fluid through the valve structure. The lever handle includes a contact surface positioned within the cavity and configured to move toward the top wall as the valve structure moves into the second position and configured to move away from the top wall as the valve structure moves into the first position.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, disclosed herein is a handwashing assembly with an intuitive valve control structure structured to operate the handwashing assembly for easy, sanitary, and hygienic hand washing using a minimal amount of water. Accordingly, the handwashing assembly is particularly useful in locations that do not have water plumbing, where water is scarce, and/or where water needs to be conserved. The handwashing assembly allows the user to easily access water, but does not let water run or be wasted while the user is not using the handwashing assembly, is not scrubbing their hands, or between uses in order to conserve water and reduce how much the handwashing assembly (specifically the water vessel) needs to be refilled with water. Since the handwashing assembly is wrist-activated, the handwashing assembly reduces the spread of infection or bacteria and prevents the user's hands from being recontaminated when turning off the water flow.

Additionally, the handwashing assembly is easily adaptable to a variety of different environments and can utilize a variety of different water vessels. In order to be easily assembled and to reduce the cost (which is of particular importance in areas with scarce amounts of water), the number of components within the handwashing assembly is minimized. Overall, the handwashing assembly is intuitively designed such that users who are unfamiliar with the handwashing assembly can use the handwashing assembly without instructions or directions and is convenient such that users are more likely to wash their hands more frequently.

Figure 1:
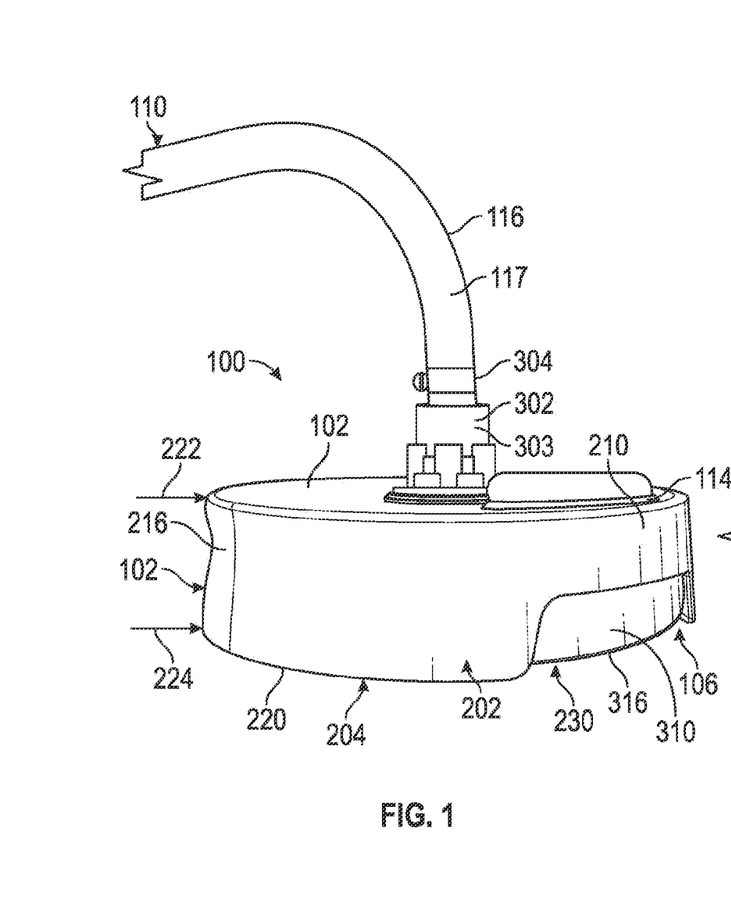
FIG. 1 is a side perspective view of a handwashing assembly, according to an exemplary embodiment.

As shown in FIG. 1, a handwashing assembly 100 provides a user with an easy and sanitary system for washing their hands. The handwashing assembly 100 can be used within a variety of different areas in which handwashing is needed. For example, the handwashing assembly 100 can be used within bathrooms (and therefore located near a toilet, for example), kitchens (and therefore located near a food preparation station, for example), schools, health centers, community centers, or other building structures.

Figure 2:
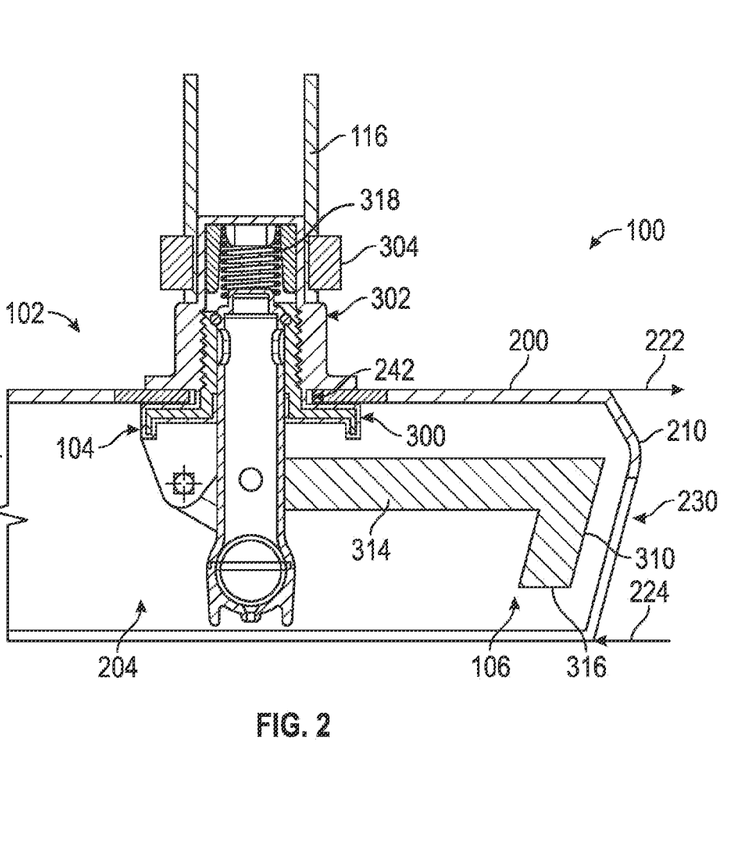
FIG. 2 is a detailed cross-sectional view of the handwashing assembly of FIG. 1, according to an exemplary embodiment.

The handwashing assembly 100 includes a valve housing, shown as hood 102, a valve structure 104 (as shown in FIG. 2), and a valve control, shown as lever handle 106. A fluid source, shown as water supply 110, may be fluidly coupled to the handwashing assembly 100 via the valve structure 104. The handwashing assembly 100 may also optionally include additional components, including, but not limited to, a liquid waste bin 112.

In some embodiments, one or more components of the handwashing assembly 100 may be the same as or similar to that of the handwashing assembly described in U.S. patent application Ser. No. 17/187,005 filed Feb. 26, 2021, the entirety of which is incorporated by reference herein.

Generally speaking, the hood 102 is configured to protect the valve structure 104 from damage, to improve the aesthetics and durability of the handwashing system, and to improve the ease of use of the handwashing assembly 100. The hood 102 may be formed of plastic, wood, metal, metal alloys, a polymer, or similar materials or combinations of materials that are both durable and corrosion-resistant. In some embodiments, the hood 102 is configured for use outside, and thus the hood 102 may be formed of a material that can withstand freezing temperatures and direct sunlight without fading, cracking, or deteriorating. The hood 102 is also configured to receive a flow of water from the water supply 110. The water supply 110 may take many forms based on the desired location of the handwashing assembly 100. For example, the water supply 110 may be a large bucket or vessel (e.g., oil drum, 55-gallon drum, etc.) configured to hold a volume of water or similar liquid. The valve structure 104 may be fluidly coupled to the water supply 110 such that the valve structure 104 is operable to discharge a flow of water. The handwashing assembly 100 may depend upon the potential energy provided by gravity and the water pressure within the liquid vessel to discharge the water from the valve structure 104. In some embodiments, where the water supply 110 is a liquid vessel or bucket, the valve structure 104 may extend into the liquid vessel and be operable to discharge a flow of water from the liquid vessel. In some embodiments, where the water supply 110 is received from a hose 116 or conduit, the hose 116 may be coupled to or clamped to the valve structure 104. In some embodiments, the water supply 110 may be a garden hose or other pressurized water conduit (e.g., spigot, pump, utility conduit, etc.) such that the pressure within the hose 116 is configured to facilitate a flow of water through the valve structure 104 when the valve structure 104 is operated to discharge water.

The hose 116 may further comprise a filter element 117 disposed within the hose 116, fluidly coupled to the valve structure 104. The filter element 117 is configured to filter any unnecessary material (e.g., particles, etc.) from the water that may obstruct a water output. As can be appreciated, the filter element 117 may comprise a filter screen that is configured to catch particles that are otherwise larger in size then that of the water output. In some embodiments, the hose 116 may further comprise an additional filter element positioned proximate to the filter element 117 such to provide an additional filtering process.

The valve structure 104 may be operably coupled to the lever handle 106 such that an interaction with the lever handle 106 results in operation of the valve structure 104. Generally speaking, the valve structure 104 is operable between two positions: a first (e.g., closed) position and a second (e.g., open) position. As will be appreciated, the valve structure 104, being a physical valve, may be operable in between a first position and a second position, as there may be varying degrees of "open." Take, for example, a sink faucet, where the position of the handle affects the flow rate of the water being discharged from the sink faucet. Similarly, varying degrees of pressure applied to the lever handle 106 may affect a flow rate of water discharged from the valve structure 104.

Referring generally to FIGS. 1-4, the hood 102 is shown according to an exemplary embodiment. The hood 102 may assume many different forms and appearances across various embodiments. The hood 102 includes a first panel 200 (e.g., a top wall) and a sidewall 202 (e.g., one or more side walls) cooperating to define a housing cavity 204. Positioned within the housing cavity 204 may be the valve structure 104 and the lever handle 106. In some embodiments, the valve structure 104 and the lever handle 106 are disposed entirely within the housing cavity 204 such that no portion of the lever handle 106 or the valve structure 104 extends outside of the housing cavity 204. This may be desirable if, for example, a plurality of handwashing assemblies 100 were being stacked and shipped together. The extension of components, such as the lever handle 106 and the valve structure 104, outside of the housing cavity 204 may cause such components to be more susceptible to damage during shipping, packing, and storage.

Figure 4:
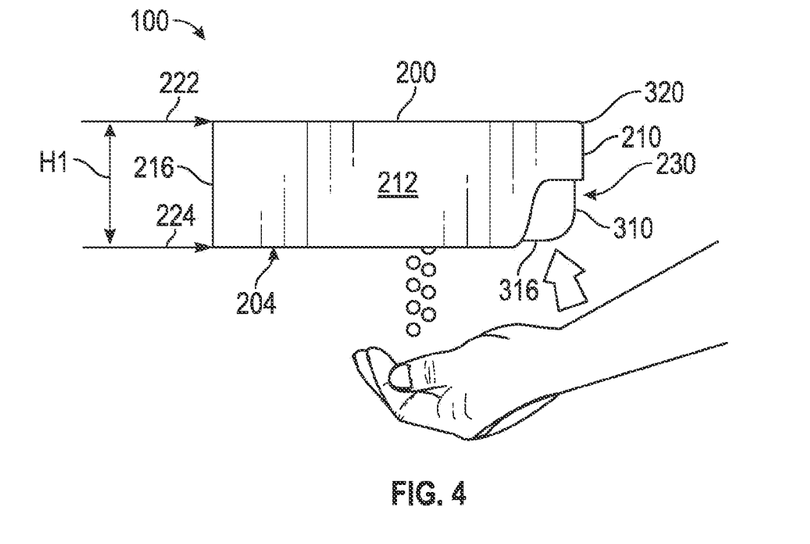
FIG. 4 is a side view of the handwashing assembly of FIG. 1, according to an exemplary embodiment.
Figure 5:
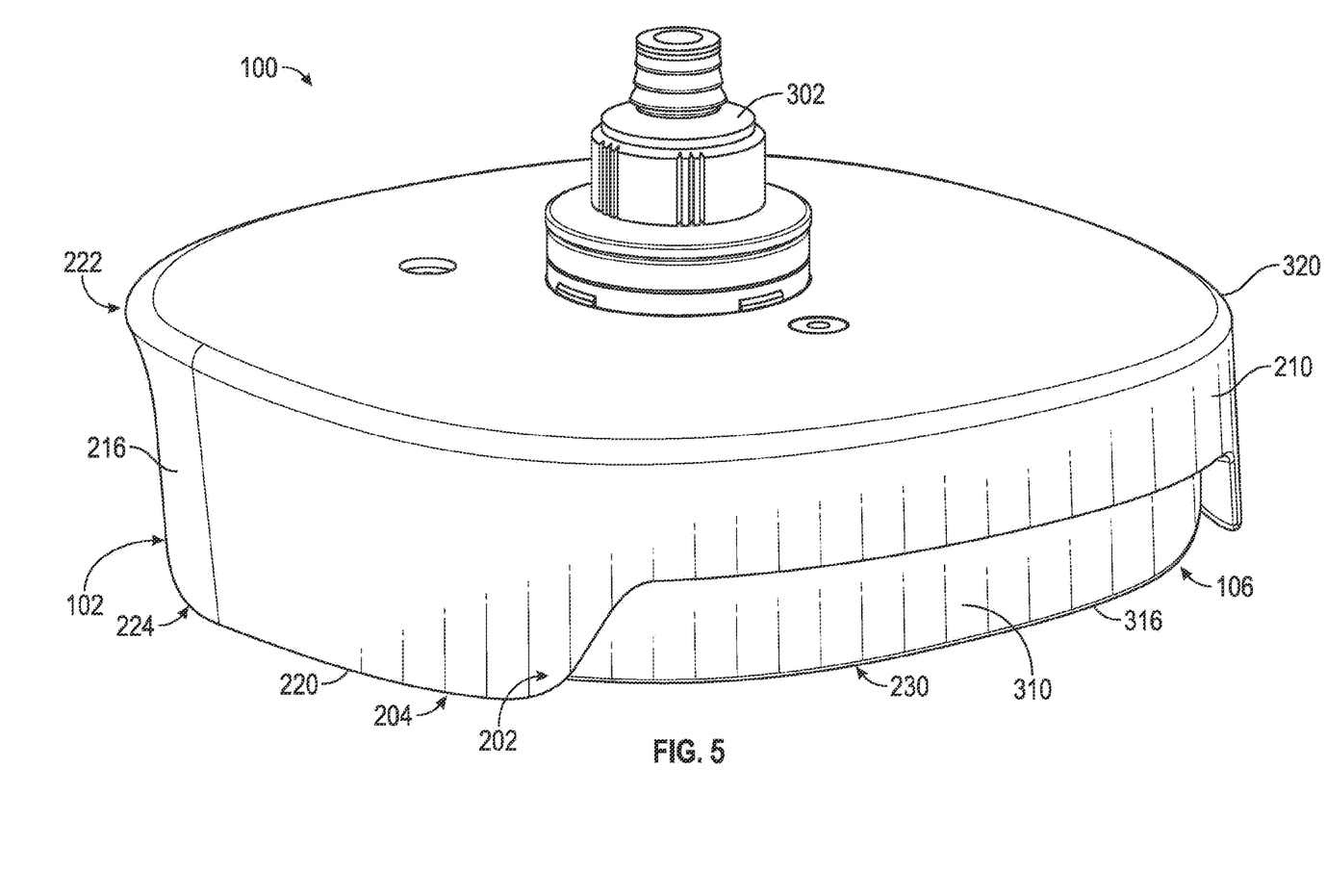
FIG. 5 is a perspective view of the handwashing assembly of FIG. 1, according to an exemplary embodiment.

Referring specifically to FIG. 1, the lever handle 106 may be positioned proximate a first side 210 of the hood 102. While the hood 102 may assume many forms across various embodiments, it should be appreciated that the hood 102 defines the first side 210 (e.g., front, face, etc.), a second side 212 and a third side 214 opposite to the second side 212 (e.g., peripheral sides), and a fourth side 216 (e.g., back side, rearward facing side, etc.). Collectively, the first side 210, the second side 212, the third side 214, and the fourth side 216 define a contiguous sidewall (e.g., the sidewall 202), which defines the housing cavity 204. In some embodiments, the fourth side 216 is configured to be coupled to a vertical support surface, such as a wall, a tree, a post, or similar structure. Mounting the fourth side 216 to a vertical support surface may provide additional stability to the handwashing assembly 100 when the handwashing assembly 100 is in use. The sidewall 202 extends substantially orthogonally away from the first panel 200. Each of the second side 212, the third side 214, and the fourth side 216 extend away from the first panel 200 a first distance and define a sidewall height, shown as a first height $H_1$ (as shown in FIG. 4). The sidewall 202 may define a substantially annular body having a diameter approximately twice the length as the first height $H_1$ (as shown in FIG. 4). In some embodiments, the second side 212 and the fourth side 216 meet at a sharp corner and the sidewall 202 defines a regular polygon, such as a square or rectangle. In some embodiments, the sidewall 202 defines a square having rounded edges such that the second side 212 and the fourth side 216 are both substantially planar, but the second side 212 and the fourth side 216 may meet at a rounded, contiguous, and differentiable corner.

The hood 102 may further comprise a set of mounting locations, screw holes, or the like, configured to mount the handwashing assembly onto a specific body. By way of example, the hood 102 may include one mounting location on the fourth side 216, proximate the second side 212, and another mounting location on the fourth side 216, proximate the third side 214. In some embodiments, the hood 102 may include a single mounting location positioned at the midpoint of the fourth side 216. In still some embodiments, the hood 102 may include any number of mounting locations positioned at any location along the contiguous sidewall.

Opposite the first panel 200, the sidewall 202 defines a sidewall edge 220 (e.g., sidewall perimeter). The sidewall edge 220 is contiguous across all of the first side 210, the second side 212, the third side 214, and the fourth side 216. In some embodiments, the sidewall 202 tapers outward as the sidewall 202 extends away from the first panel 200 such that a horizontal cross-sectional area taken at a first plane 222 defined by the first panel 200 is less than a horizontal cross-sectional area taken at a second plane 224 partially defined by the sidewall edge 220 of the second side 212, the third side 214, and the fourth side 216. The first plane 222 and the second plane 224 are separated by the first height $H_1$ (as shown in FIG. 4).

Figure 3:
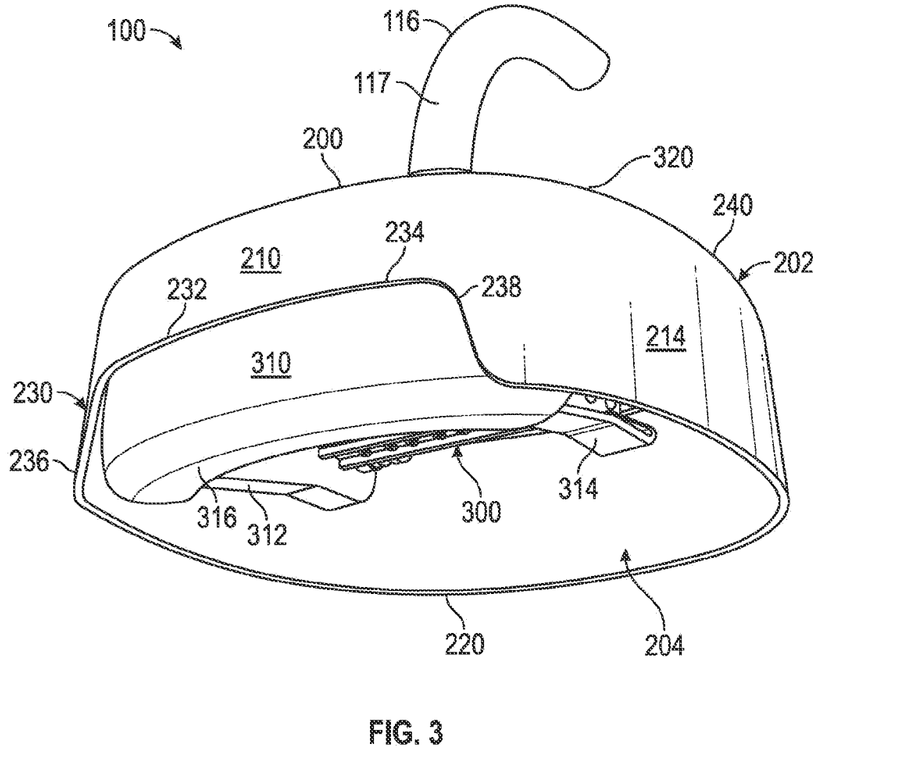
FIG. 3 is a bottom perspective view of the handwashing assembly of FIG. 1, according to an exemplary embodiment.

The first side 210 may include an interface cut-out 230, framed (e.g., defined) by a cut-out profile 232. As shown in FIG. 3, the cut-out profile 232 defines a portion of the sidewall edge 220. The interface cut-out 230, and thus the cut-out profile 232, may extend across the first side 210, extending between the second side 212 and the third side 214. The cut-out 230 is structured to allow access to the lever handle 106 through the first side 210 of the hood 102. The cut-out 230 enables a user of the system to see the lever handle 106 when a user's eye level is above the first panel 200 (e.g., the first plane 222). The cut-out 230 may allow a user to quickly identify the first side 210 of the hood 102, which may improve the user experience of the handwashing assembly 100 and allow the user to intuitively know how to interact with the lever handle 106 to discharge water from the water supply 110 via the valve structure 104.

Similar to the valve structure 104, the lever handle 106 is operable between a first position and a second position. Specifically, interaction with the lever handle 106 facilitates operation of the valve structure 104 between the first position and the second position. As shown in FIGS. 1 and 2, the lever handle 106 is in the first position. The first position is configured to be a closed position, where fluid may not flow out of the valve structure 104. The second position is configured to be an open position, where fluid may flow out of the valve structure 104. In some embodiments, the default position for the lever handle 106 is in the first position. To position the valve structure 104 in the second position such that water is discharged by the valve structure 104, a user may apply an upward force (e.g., a force in a direction generally toward the cut-out profile 232, a force in a direction generally toward the first panel 200) on the lever handle 106.

As will be appreciated, hand washing often occurs at or below shoulder level. Thus, the cut-out 230 provides clearance for a user's arm, wrist, or hand to apply a force to the lever handle 106 such that the lever handle 106 is biased toward the first panel 200. While operation of the lever handle 106 between the first position and the second position would still be possible without the cut-out 230, a user may unintentionally strike the first side 210, and more specifically the cut-out profile 232, of the hood 102 when operating the handwashing assembly 100, causing discomfort or pain. In some embodiments, the hood 102 is formed as a unitary body of plastic by injection molding. The edges of injection molded parts may be sharp, and thus engagement between a user's wrist and the cut-out profile 232 when operating the handwashing assembly 100 may cause harm to a user. In some embodiments, a guard or pad is positioned along the cut-out profile 232 such that engagement (accidental or intentional) with the cut-out profile 232 and the first side 210 does not cause discomfort or pain.

Referring to FIG. 3, the cut-out profile 232 includes a first profile edge 234, a second profile edge 236 proximate to the second side 212, and a third profile edge 238 proximate to the third side 214. The first profile edge 234 extends between the second profile edge 236 and the third profile edge 238. The first profile edge 234 may be substantially parallel to the second plane 224 and spaced apart from the second plane 224 by a height approximately equal to one-half of the first height $H_1$ (as shown in FIG. 4). The second profile edge 236 and the third profile edge 238 form a gradual transition between the first profile edge 234 and the portion of the sidewall edge 220 that lies within the second plane 224.

The hood 102 may further include a latching mechanism, tie down, strap, or the like, shown as tie down 114. The tie down 114 may be positioned on the first panel 200, proximate the first side 210. The tie down 114 is configured to secure an accessory (e.g., soap, toothbrush, or similar accessory) to the first panel 200. The tie down 114 is further configured to extend across at least a portion of the first panel 200 such that the first panel 200 may include at least two mounting locations for the tie down 114. As can be appreciated, the tie down 114 may include a locking feature, or the like, configured to tighten the tie down 114 such to secure the accessory. In some embodiments, the tie down 114 may be an elastic material where the user may stretch out the tie down 114 to place an accessory within, where tie down 114 retracts back into a neutral position when the user stops applying a force.

According to an exemplary embodiment shown in FIG. 3, the hood 102 may include a lip 240 profiled about a perimeter of the first panel 200, the lip 240 defining the transition between the first panel 200 and the sidewall 202. The lip 240 may cooperate with the first panel 200 to retain an accessory, such as the soap, a toothbrush, or a similar accessory. In some embodiments, the lip 240 includes a divot configured to allow drainage of fluids captured by the first panel 200 to drain away down the sidewall 202. For example, as user's use the soap that may be placed on the first panel 200, water and soap may collect on the first panel 200 and be collected by the lip 240. Thus, the divot may allow for fluids captured by the lip 240 to drain down the sidewall 202 and away from the first panel 200.

The valve housing may further include an aperture 242 positioned in the first panel 200. In some embodiments, the aperture 242 is positioned centrally in the first panel 200. The aperture 242 may receive the water supply 110 and the valve structure 104. In some embodiments, the valve structure 104 is positioned within the housing cavity 204 and extends through the first panel 200 via the aperture 242. For example, a first portion of the valve structure 104 may be positioned within the housing cavity 204, and a second portion of the valve structure 104 may extend through the first panel 200 via the aperture 242 and is configured to be fluidly coupled to the water supply 110.

As shown in FIG. 2, the valve structure 104 includes a first valve portion 300 and a second valve portion 302. The first valve portion 300 is positioned within the housing cavity 204 and extends through the aperture 242 and through the first panel 200. The second valve portion 302 is configured to be coupled to the first valve portion 300, such as by threading, PVC glue, rubber cement, fasteners, or the like. In some embodiments, the second valve portion 302 is fluidly coupled to the first valve portion 300 such that a flow of water received by the second valve portion 302 is delivered to the first valve portion 300. In some embodiments, such as shown in FIGS. 1 and 2, the second valve portion 302 is fluidly coupled to the water supply 110 with a fitting 304, such as a hose fitting, pipe fitting, zip ties, or the like. As shown in FIG. 2, the valve structure 104 is in the first position. Thus, even if the water supply 110 is pressurized, the valve structure 104 prevents a flow of water from being discharged. When the lever handle 106 is engaged and an upward force is applied to the lever handle 106, the valve structure 104 transitions out of the first portion and a flow of water is discharged from the valve structure 104, and thus from the handwashing assembly 100.

The handwashing assembly 100 further includes a flow device, shown as flow restrictor 303. The flow restrictor 303 is fluidly coupled to both the valve structure 104 and the lever handle 106. The flow restrictor 303 is configured to regulate the volume of liquid discharged through the valve structure 104. By way of example, the flow restrictor 303 may include at least one orifice disposed within the flow restrictor 303 configured to regulate the amount of liquid flowing through the flow restrictor 303. In some embodiments, the amount of force exerted onto the lever handle 106 may change the volumetric flow rate of the liquid out of the valve structure 104. For example, the larger the force exerted onto the lever handle 106, the higher the volumetric flow rate of the liquid. To be more precise, the flow restrictor 303 is configured to maintain a volumetric flow rate of 1-2 liters per minute for up to 10 minutes of head pressure. In some embodiments, the flow restrictor 303 maintains a volumetric flow rate less than 1 liter per minute. According to an exemplary embodiment, the flow restrictor 303 may include a control valve, where the user moves the control valve to change the volumetric flow rate of the liquid passing through the flow restrictor 303.

As shown in FIG. 2, the lever handle 106 further includes a retracting mechanism 318 operably coupled to both the first control arm 312 and the second control arm 314. The retracting mechanism 318 is configured to bias the lever handle into the first position (e.g., closed position) to prevent fluid from flowing out of the valve structure 104 when the user is not applying a force on the lever handle 106. By way of example, the retracting mechanism 318 may be a spring, cylinder, or the like. When the user provides an upward force onto the lever handle 106, the applied force must be greater than the biasing force applied by the retracting mechanism 318 in order to move the lever handle 106 out of the first position. In some embodiments, the retracting mechanism 318 may comprise an assist that is configured to assist the user in overcoming the bias force when the user interfaces with the assist.

As shown in FIGS. 3 and 4, the lever handle 106 includes a substantially smooth contact surface 310, a first control arm 312, and a second control arm 314. The first control arm 312 and the second control arm 314 operatively couple the contact surface 310 to the valve structure 104 such that a force applied to the contact surface 310 is translated to the valve structure 104 to transition the valve structure 104 between the first position and the second position. The contact surface 310 may be formed by vacuum molding, injection molding, or the like. The contact surface 310 may be formed of plastic, metal, wood, metal alloys, or a polymer. When the lever handle 106 is operatively coupled to the valve structure 104, the contact surface 310 extends across the first side 210 such that a portion of the contact surface 310 is positioned in confronting relation to the second side 212 and the third side 214. The contact surface 310 is also positioned proximate to the cut-out 230 such that the contact surface 310 may be engaged by a user. The contact surface 310 also includes a lower contact portion 316. The lower contact portion 316 may be substantially planner and my lie within the second plane 224. In some embodiments, the lower contact portion 316 is separated from the second plane 224 by a short (less that one inch) distance. In some embodiments, the contact surface 310 does not extend outside of the housing cavity 204. Generally speaking, when a user interacts with the lever handle 106 to operate the valve structure 104, the user interfaces with the lower contact portion 316, applying a force to the lower contact portion 316, biasing the contact surface 310 toward the first panel 200, and transitioning the valve structure 104 out of the first position. To be more precise, the lever handle 106 is fixedly coupled to the valve structure 104 such that when the user provides an upward force onto the lever handle 106, the valve structure 104 is positioned into an upward position (e.g., second position) allowing fluid to flow out of the valve structure 104. When the user releases from the lever handle 106, the valve structure 104 is positioned back into the lowered position (e.g., first position) preventing fluid to flow out of the valve structure 104. The first control arm 312 and the second control arm 314 may be integrally formed with the contact surface 310. The first control arm 312 and the second control arm 314 may be structured to handle the cyclic loading caused by users applying a force to the contact surface 310.

Referring generally to FIGS. 1-5, the plurality of sidewalls 202 are configured to form the contiguous sidewall that encompasses the valve structure 104. The plurality of sidewalls 202 abut the first panel 200 at an edge 320. The edge 320 is configured to be the circumference of a circle, and extends along at least a portion of the hood 102. In some embodiments, the edge 320 may be relatively square and includes a corner, where the corner extends along at least a portion of the hood 102.

Figure 6:
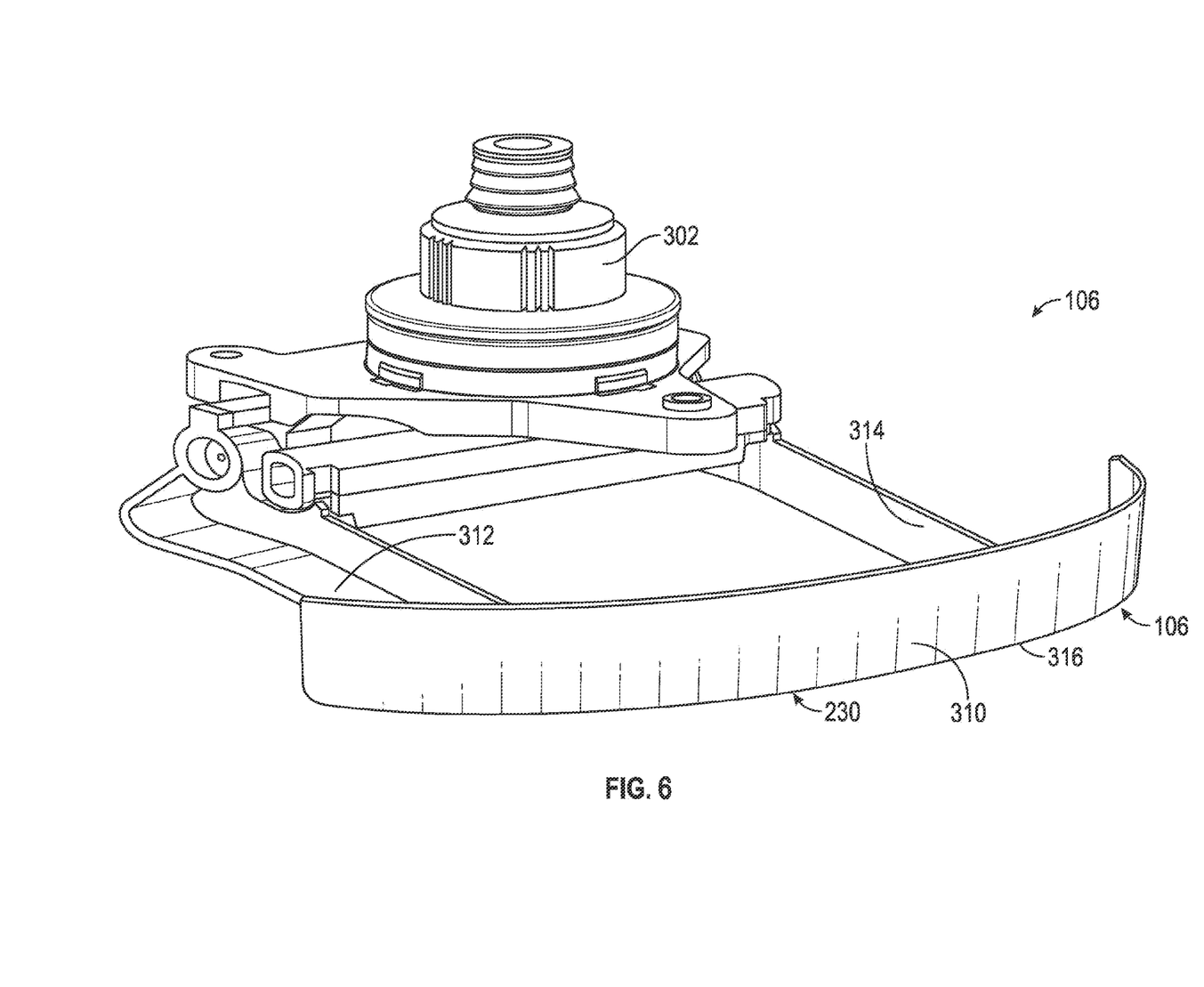
FIG. 6 is a perspective view of a lever handle of the handwashing of FIG. 1, according to an exemplary embodiment.

Referring specifically to FIG. 6, the lever handle 106 comprises the first control arm 312 and the second control arm 314, positioned adjacent one another on the lever handle 106. The first control arm 312 and the second control arm 314 are further disposed parallel to one another along the length of the handwashing assembly 100. In some embodiments, the first control arm 312 and the second control arm 314 are not disposed parallel to one another such that the lever handle 106 is coupled to the valve structure 104 at varying locations.

Figure 7:
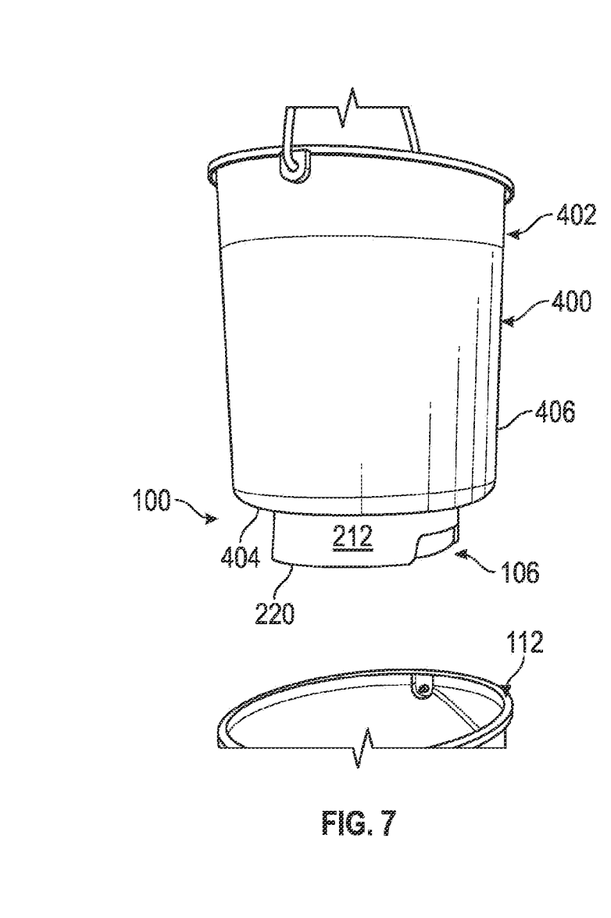
FIG. 7 is a perspective view of the handwashing assembly of FIG. 1 operatively coupled to a vessel, according to an exemplary embodiment.
Figure 8:
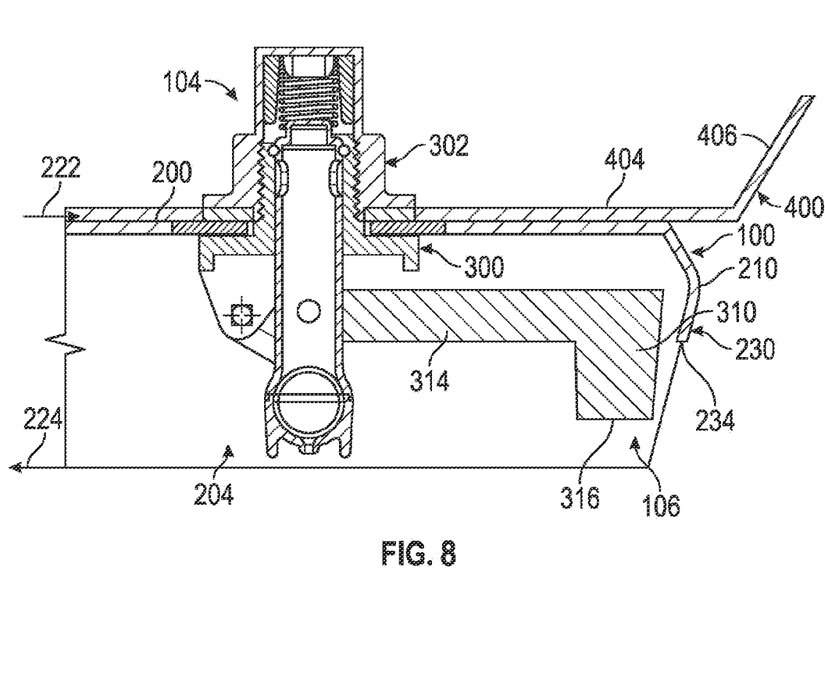
FIG. 8 is a detailed cross-sectional view of the handwashing assembly of FIG. 5, according to an exemplary embodiment.

Referring now to FIGS. 7 and 8, the handwashing assembly 100 is shown according to another exemplary embodiment. The handwashing assembly 100 may be configured for use with a basin of water, such as a small pail of water, a 55-gallon drum, or a rain barrel. The embodiment shown in FIGS. 7 and 8 is similar to the embodiment shown in FIGS. 1-6, but the water supply 110 has been replaced with a different type of water supply in the form of the liquid vessel 400. A difference between the handwashing assembly 100 of FIGS. 1 and 8 when compared to the handwashing assembly 100 of FIGS. 1-4 is that the second valve portion 302 of the handwashing assembly 100 of FIG. 4 is configured to be disposed within the water supply 110.

The water supply 110 is shown as a liquid vessel 400. The liquid vessel 400 (e.g., the water bucket, receptacle, container, barrel, drum, or liquid vessel 400) may be any variety of different containers that are configured to contain and store a liquid. Although water is referred to herein, it is understood that the liquid vessel 400 may store and release (via the valve structure 104) a variety of different liquids, such as soapy water. Due to the configuration and adaptability of the hood 102 and the valve structure 104, the hood 102 and valve structure 104 can be attached to a wide variety of differently sized and shaped water vessels. Accordingly, a wide variety of different types of liquid vessels 400 may be used with the handwashing assembly 100, according to the user's preference and what is available to be used. The size or capacity of the liquid vessel 400 may depend on what the handwashing assembly 100 is being used for (e.g., how many people will be using the handwashing assembly 100 and with what frequency, how often and easily the liquid vessel 400 can be refilled).

The handwashing assembly 100 is attached to the liquid vessel 400 such that, upon activation of the lever handle 106, liquid (i.e., water) can flow from within the liquid vessel 400 onto the user's hands. As shown in FIG. 7, the liquid vessel 400 includes a shell 402 that extends about the body of the liquid vessel 400 and defines a base 404 and a side 406 that cooperate to define an inner area of the liquid vessel 400 that is configured to contain a liquid (i.e., water). In order to attach the handwashing assembly 100 to the liquid vessel 400, an aperture or hole 408 (which may optionally be circular) is drilled or cut in the base 404, extending completely through the shell 402. As described further herein, the valve structure 104 is positioned such that the valve structure 104 extends through the aperture 242 of the hood 102 and through the hole 408 of the liquid vessel 400. According to one embodiment, the diameter of the hole 408 is approximately 25 to 35 millimeters. Since the handwashing assembly 100 may be attached to the base 404, at least a portion of the handwashing assembly 100 may be positioned vertically below (and optionally directly underneath) the liquid vessel 400.

According to an exemplary embodiment, the handwashing assembly 100 may include a flange configured to support the handwashing assembly 100 over a ledge in an environment where suspending the liquid vessel 400 and the handwashing assembly 100 would be impractical. The handwashing assembly 100 may be fluidly coupled to the liquid vessel 400 and cooperate with the liquid vessel 400 to discharge a flow of water. However, the valve structure 104 of the handwashing assembly 100 is not required to be positioned within or directly beneath the liquid vessel 400. The hood 102 includes a hood flange which extends beyond the fourth side 216. The hood flange may be substantially planar and include the first panel 200, the first panel 200 extending across an entirety of the hood flange. The hood flange may define a first flange end proximate to the fourth side 216 and a second flange end opposite to the first flange end. When the hood 102 is coupled to the liquid vessel 400, the hood flange may be interposed between the liquid vessel 400 and a substantially planar surface. The planar surface may be a mantle, a step, a stair, a table, a truck bed, or a similar structure. The hood flange allows the handwashing assembly, and more specifically the valve structure 104, to extend beyond an edge of the planar surface and to extend below the planar surface.

Referring still to the exemplary embodiment, integrated within the first panel 200 may be a ridge extending orthogonally away from the first panel 200 in a direction generally opposite from the housing cavity 204. The ridge may be configured to secure an accessory. The first panel 200 also includes the aperture 242. The ridge may be positioned between the aperture 242 and the first side 210 such that a ridge area defined by a perimeter of the ridge is positioned entirely between the aperture 242 and the first side 210. The aperture 242 is configured to receive a portion of the valve structure 104 such that that valve structure 104 is coupled to the hood 102.

Referring still to the exemplary embodiment, the handwashing assembly 100 further includes a conduit configured to receive the liquid from the liquid vessel 400 and deliver the liquid to the valve structure 104. The valve structure 104 may be partially disposed within the housing cavity 204, extend through the aperture 242 in the first panel 200, and be fluidly coupled to the conduit. The conduit may be coupled to the shell 402 of the liquid vessel 400, and more specifically coupled to a side 406 of the liquid vessel 400 proximate to the base 404 to increase the water pressure at the conduit. The conduit may be configured to extend orthogonally away from the liquid vessel 400, bend at approximately 90 degrees in a direction generally toward the base 404, and be configured to be fluidly coupled to the valve structure 104.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the valve structure 104 of the exemplary embodiment described with reference to FIGS. 1-6 may be incorporated in the handwashing assembly of the exemplary embodiment described with reference to FIGS. 7-8, and vice versa. Although only one example of an element from one embodiment that can be incorporated or utilized in another embodiment has been described above, it should be appreciated that other elements of the various embodiments may be incorporated or utilized with any of the other embodiments disclosed herein.

What is claimed is:
1. A handwashing assembly comprising:
a hood comprising:
a top wall having an aperture extending through the top wall; and
one or more sidewalls extending substantially downward from a perimeter of the top wall and cooperating with the top wall to define a cavity within the hood;
a valve structure positioned at least partially within the cavity and configured to be fluidly coupled to a fluid source and configured to receive a flow of fluid from the fluid source through the aperture; and a lever handle operatively coupled to the valve structure and configured to move the valve structure between a first position in which the valve structure prevents the flow of the fluid through the valve structure and a second position in which the valve structure permits the flow of the fluid through the valve structure;

the lever handle comprising a contact surface positioned within the cavity and configured to move toward the top wall as the valve structure moves into the second position and configured to move away from the top wall as the valve structure moves into the first position.

2. The handwashing assembly of claim 1, further comprising a fluid vessel located above the top wall and fluidly coupled to the valve structure, wherein the fluid vessel is the fluid source.

3. The handwashing assembly of claim 1, further comprising a filter element disposed between the fluid source and the valve structure and configured to remove particles from the flow of the fluid.

4. The handwashing assembly of claim 1, wherein the lever handle is positioned entirely within the cavity.

5. The handwashing assembly of claim 1, wherein the one or more sidewalls define a sidewall edge forming a contiguous lower perimeter of the one or more sidewalls offset from the top wall.

6. The handwashing assembly of claim 1, wherein the one or more sidewalls comprise a cut-out extending along a portion of the one or more sidewalls and the lever handle extends from the valve structure toward the cut-out.

7. The handwashing assembly of claim 1, wherein a first portion of the one or more sidewalls extends substantially downward from the top wall by a first height, and a second portion of the one or more sidewalls extends substantially downward from the top wall by a second height approximately half the first height to define a cut-out edge offset from the top wall by the second height.

8. The handwashing assembly of claim 1, further comprising a spring or weight coupled to the lever handle and configured to bias the lever handle toward the first position when a user is not applying a force to the lever handle.

9. The handwashing assembly of claim 1, wherein the contact surface is substantially parallel to the top wall and extends along a lower portion of the lever handle.

10. The handwashing assembly of claim 1, wherein the lever handle further comprises a first control arm and a second control arm parallel to the first control arm, the first control arm and the second control extending between the contact surface and the valve structure and coupling the contact surface to the valve structure.

11. The handwashing assembly of claim 1, wherein lever handle causes the valve structure to move into the second position in which fluid flows through the valve structure when a user applies an upward force to the contact surface.

12. The handwashing assembly of claim 11, wherein the upward force is applied to the contact surface by a hand or forearm of the user that extends through a cut-out in the one or more sidewalls.

13. The handwashing assembly of claim 11, wherein a spring or weight acts in an opposing direction to the upward force, the spring or weight configured to bias the lever handle and the valve structure toward the first position.

14. The handwashing assembly of claim 1, wherein the valve structure comprises:

an upper portion located outside the cavity above the top wall and configured to be coupled to the fluid source outside the cavity;

a lower portion coupled to the lever handle within the cavity and configured to transfer an upward force to the valve structure to cause the valve structure to move upward when the upward force is applied to the contact surface.

15. The handwashing assembly of claim 1, wherein the one or more sidewalls comprise:

a first portion that extends from the top wall to a lower plane offset from the top wall by a first distance; and a second portion that extends from the top wall to an intermediate plane offset from the top wall by a second distance less than the first distance, wherein the cut-out is located adjacent to the second portion between the intermediate plane and the lower plane.

16. A handwashing assembly comprising:

a hood at least partially encompassing a cavity, the hood comprising an aperture extending through the hood to the cavity;

a valve structure positioned at least partially within the cavity, the valve structure receiving fluid from a fluid source through the aperture; and a lever handle with a contact surface positioned within the cavity, the lever handle operatively coupled to the valve structure, wherein pressure exerted on the contact surface of the lever handle by a user causing the lever handle to move the valve structure from:

a first position in which the valve structure prevents the flow of the fluid through the valve structure, to a second position in which the valve structure permits the flow of the fluid through the valve structure.

17. The handwashing assembly of claim 16, wherein the lever handle moves upwardly when moving to the second position and downwardly when moving back to the first position.

18. The handwashing assembly of claim 16, further comprising a retracting mechanism coupled to the lever handle and configured to bias the lever handle toward the first position when the user is not applying a force to the lever handle.

19. The handwashing assembly of claim 18, wherein the retracting mechanism is a spring or a weight.

20. A method comprising:

providing a hood comprising a top wall and one or more sidewalls extending substantially downward from a perimeter of the top wall and cooperating with the top wall to define a cavity within the hood;

creating an aperture extending through the top wall into the cavity; and positioning a valve structure at least partially within the, the value structure being configured to be fluidly coupled to a fluid source to receive a flow of fluid from the fluid source through the aperture; and operatively coupling a lever handle to the valve structure, the lever handle being configured to move the valve structure between a first position in which the valve structure prevents the flow of the fluid through the valve structure and a second position in which the valve structure permits the flow of the fluid through the valve structure;

wherein the lever handle comprises a contact surface positioned within the cavity and configured to move toward the top wall as the valve structure moves into the second position and configured to move away from the top wall as the valve structure moves into the first position.

* * * * *